(12) United States Patent
Durand et al.

(10) Patent No.: US 9,323,632 B2
(45) Date of Patent: *Apr. 26, 2016

(54) MONITORING PHYSICAL PARAMETERS IN AN EMULATION ENVIRONMENT

(75) Inventors: Eric Durand, La Ville Du Bois (FR); Christophe Joubert, Bretigny sur Orge (FR); Christian Niquet, Antony (FR); Virginie Voirin, Palaiseau (FR)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/468,645

(22) Filed: May 10, 2012

(65) Prior Publication Data

US 2012/0226488 A1    Sep. 6, 2012

Related U.S. Application Data

(63) Continuation of application No. 12/948,468, filed on Nov. 17, 2010, now Pat. No. 8,195,446, which is a continuation of application No. 12/503,711, filed on Jul. 15, 2009, now Pat. No. 7,848,914, which is a (Continued)

(51) Int. Cl.
  *G06F 9/455* (2006.01)
  *G06F 11/26* (2006.01)

(52) U.S. Cl.
  CPC ................................... *G06F 11/261* (2013.01)

(58) Field of Classification Search
  CPC . G06F 11/261; G06F 13/105; G06F 17/5022; G06F 17/5027; G06F 17/5072; G07F 17/5068

USPC ................................................. 703/23, 28, 27
See application file for complete search history.

(56) References Cited

U.S. PATENT DOCUMENTS

| 5,835,930 A | 11/1998 | Dobbek |
| 5,838,948 A | 11/1998 | Bunza |
| 5,838,949 A | 11/1998 | Hassoun |

(Continued)

FOREIGN PATENT DOCUMENTS

| EP | 0 935 195 | 8/1999 |
| WO | WO 01/95238 | 12/2001 |

OTHER PUBLICATIONS

Babb et al. (Logic Emulation with Virtual Wires, Jun. 1997 (pp. 609-626)).*

(Continued)

*Primary Examiner* — Dwin M Craig
*Assistant Examiner* — Andre Pierre Louis
(74) *Attorney, Agent, or Firm* — Klarquist Sparkman, LLP

(57) ABSTRACT

A method and system is disclosed for monitoring and viewing physical parameters while the emulator is emulating a design. Additionally, the parameters are in real time or substantially real time, such as after a periodic update. In one embodiment, a monitoring portion of the emulator periodically monitors the emulator boards and power supplies for physical information. The physical information is communicated to a workstation for communication to a user. For example, the workstation can display the physical information in a graphical user interface (GUI) that shows which boards are plugged in the system and which slots are empty. In yet another aspect, the user can select a particular board in the system and view communication information, such as data errors, status, link errors, global errors, etc.

20 Claims, 17 Drawing Sheets

Related U.S. Application Data continuation of application No. 11/517,227, filed on Sep. 5, 2006, now Pat. No. 7,567,894, which is a continuation of application No. PCT/EP2006/060335, filed on Feb. 28, 2006.

(56) References Cited

U.S. PATENT DOCUMENTS

| | | | |
|---|---|---|---|
| 5,903,744 A | 5/1999 | Tseng et al. | |
| 5,909,180 A * | 6/1999 | Bailey et al. | 340/639 |
| 5,946,471 A * | 8/1999 | Voorhees et al. | 703/23 |
| 5,963,735 A | 10/1999 | Sample et al. | |
| 6,009,256 A | 12/1999 | Tseng et al. | |
| 6,026,230 A | 2/2000 | Lin et al. | |
| 6,134,516 A | 10/2000 | Wang et al. | |
| 6,230,119 B1 | 5/2001 | Mitchell | |
| 6,266,721 B1 | 7/2001 | Sheikh et al. | |
| 6,332,201 B1 | 12/2001 | Chin et al. | |
| 6,445,969 B1 | 9/2002 | Kenney et al. | |
| 6,511,223 B1 * | 1/2003 | Austen et al. | 374/166 |
| 6,539,535 B2 | 3/2003 | Butts et al. | |
| 6,640,166 B2 * | 10/2003 | Liebl et al. | 701/29.1 |
| 6,665,706 B2 | 12/2003 | Kenner et al. | |
| 6,691,251 B2 | 2/2004 | Wong | |
| 6,698,012 B1 | 2/2004 | Kossatchev et al. | |
| 6,704,895 B1 | 3/2004 | Swoboda et al. | |
| 6,721,922 B1 | 4/2004 | Walters et al. | |
| 6,732,068 B2 | 5/2004 | Sample et al. | |
| 6,839,013 B1 | 1/2005 | Cummins et al. | |
| 7,089,170 B2 | 8/2006 | Buckmaster et al. | |
| 7,171,347 B2 | 1/2007 | Khaira et al. | |
| 7,337,104 B2 | 2/2008 | Engel et al. | |
| 7,440,886 B2 | 10/2008 | Bress et al. | |
| 7,475,288 B2 | 1/2009 | Multhaup et al. | |
| 7,480,609 B1 | 1/2009 | Cavanagh et al. | |
| 7,546,571 B2 | 6/2009 | Mankin et al. | |
| 7,567,894 B2 | 7/2009 | Durand et al. | |
| 7,577,558 B2 | 8/2009 | Birguer | |
| 7,848,914 B2 | 12/2010 | Durand et al. | |
| 2001/0020251 A1 | 9/2001 | Sheikh et al. | |
| 2002/0108094 A1 | 8/2002 | Scurry | |
| 2002/0170030 A1 | 11/2002 | Halcomb et al. | |
| 2003/0069724 A1 | 4/2003 | Schubert et al. | |
| 2003/0074177 A1 | 4/2003 | Bowen | |
| 2003/0074178 A1 | 4/2003 | Sample et al. | |
| 2003/0115506 A1 | 6/2003 | Edwards et al. | |
| 2004/0025165 A1 | 2/2004 | Desoli et al. | |
| 2005/0193251 A1 | 9/2005 | Chuang et al. | |
| 2005/0268195 A1 | 12/2005 | Lund et al. | |
| 2006/0059387 A1 * | 3/2006 | Swoboda et al. | 714/30 |
| 2006/0130013 A1 | 6/2006 | Penzias et al. | |
| 2006/0290366 A1 * | 12/2006 | Kon et al. | 324/760 |
| 2007/0113209 A1 | 5/2007 | Park et al. | |
| 2007/0203687 A1 | 8/2007 | Durand et al. | |
| 2007/0226541 A1 | 9/2007 | Brunot et al. | |
| 2008/0016396 A1 | 1/2008 | Higashi et al. | |
| 2008/0055288 A1 * | 3/2008 | Kawada et al. | 345/204 |
| 2009/0106604 A1 | 4/2009 | Lange et al. | |
| 2009/0177459 A1 | 7/2009 | Durand et al. | |
| 2009/0182544 A1 | 7/2009 | Durand et al. | |
| 2009/0216514 A1 | 8/2009 | Durand et al. | |
| 2009/0240457 A1 | 9/2009 | Durand et al. | |
| 2009/0248390 A1 | 10/2009 | Durand et al. | |
| 2009/0299723 A1 | 12/2009 | Durand et al. | |

OTHER PUBLICATIONS

International Search Report and Written Opinion for PCT/EP2006/060335, filed Feb. 28, 2006.
Izumi et al., Proposal of the Web-Based Training System for the Experiment of the Digital Circuit, The 27th Annual Conference of the IEEE Industrial Electronics Society, 2001, pp. 1766-1770.
Kumar (Prototyping the M68060 for Concurrent Verification, IEEE 1997).
Liu et al., A New Method of TOE Architecture Bassed on the ML403 Development Board in Linux, First International Multi-Symposiums on Computer and Computational Sciences, 2006, pp. 160-166.
Sun et al., Using MATLAB as a Semi-Automated Circuit Emulator with Symbolic Capabilities, pp. 253-258, IEEE 2000.
Zuver et al., Internet-Based Tool for System-On-Chip Project Testing and Grading, IEEE International Conference on Microelectronic Systems Education, 2003, pp. 119-120.

* cited by examiner

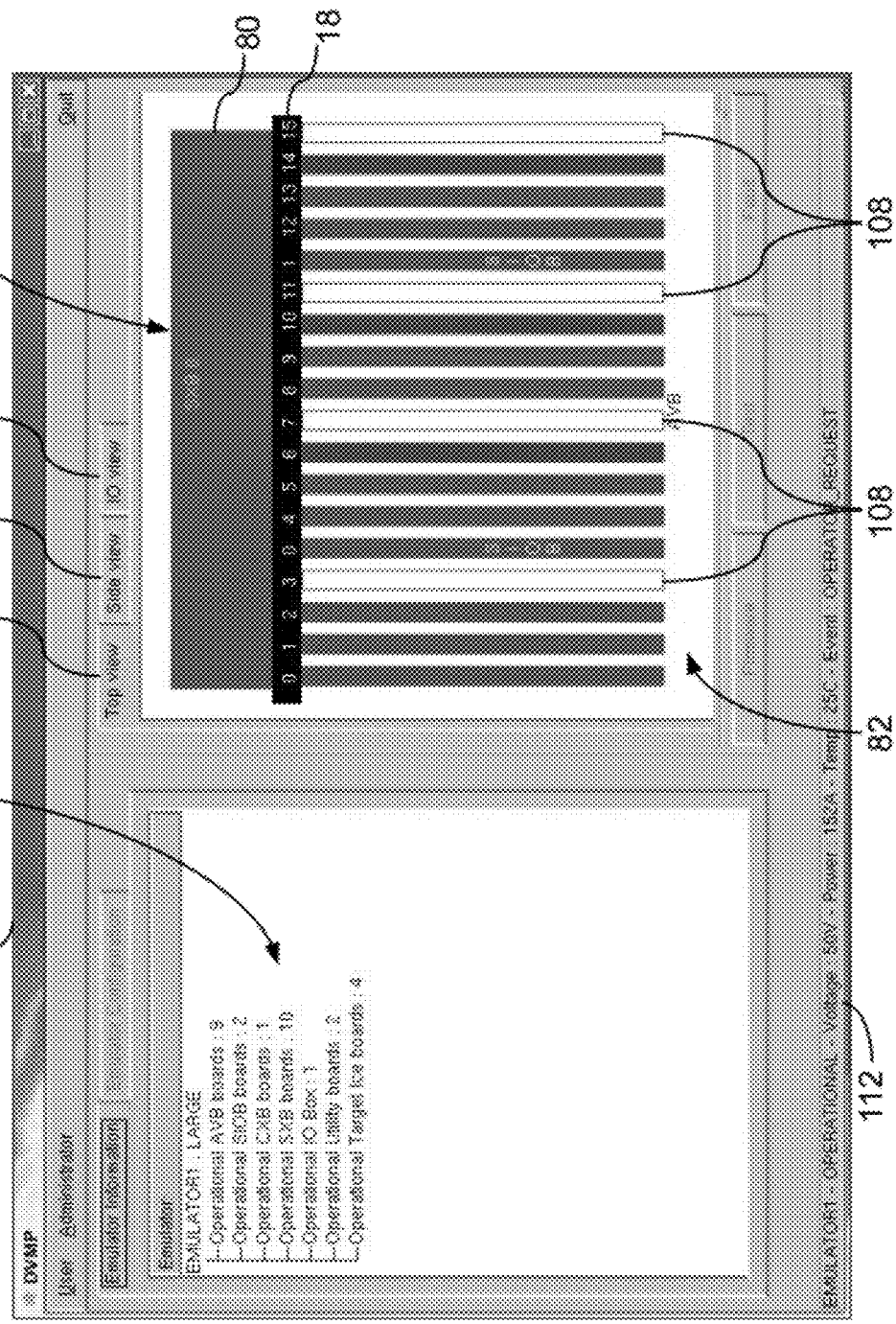

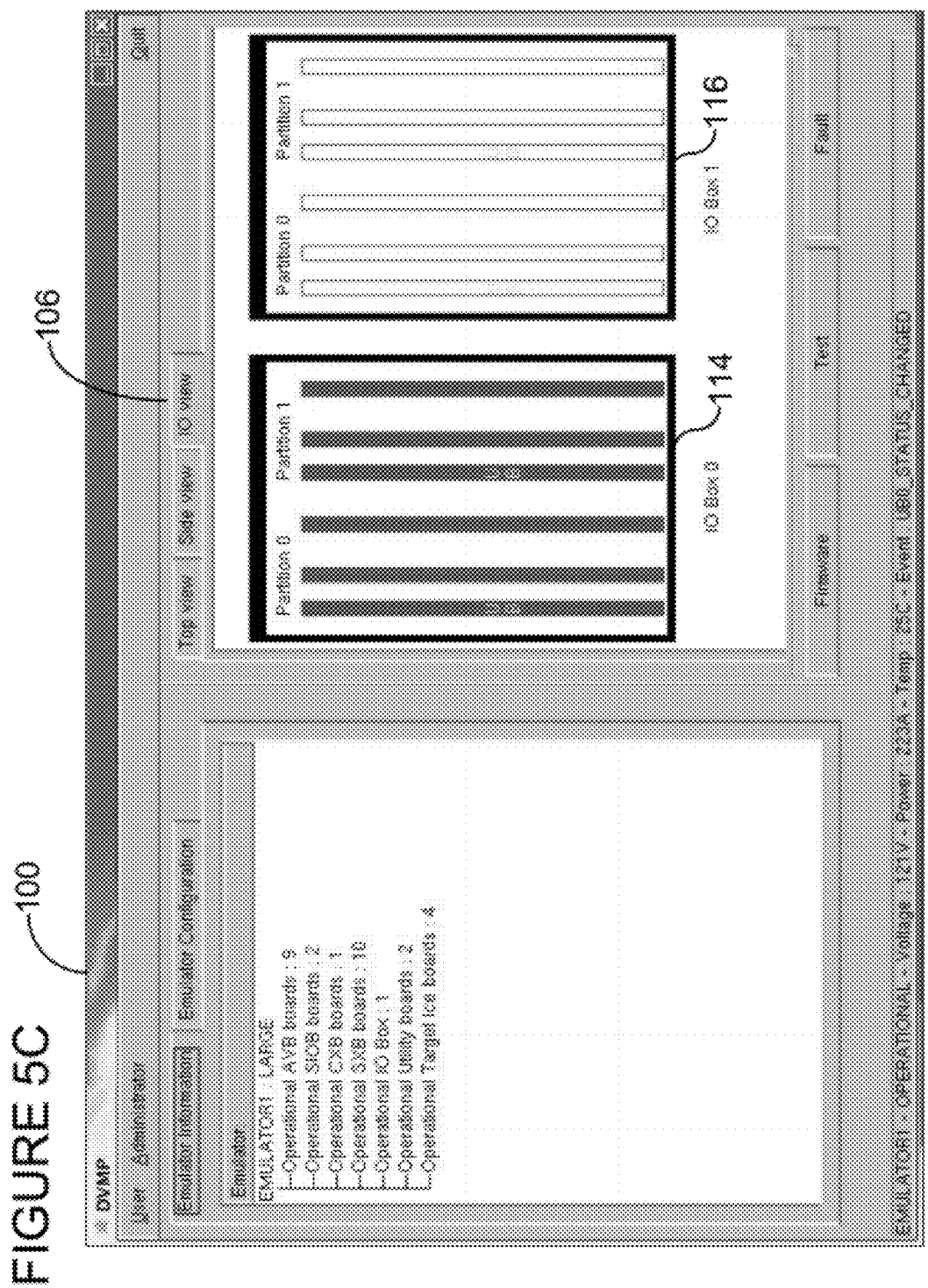

FIGURE 6A

Communication Information

PMB | AVB | SCB | IOBOX

Uplink port

| Port number | 0 |
| --- | --- |
| Status | 77 |
| Catastrophic errors | 120 |
| Link errors | 241 |
| Data errors | 362 |
| Packets marked bad errors | 483 |
| Global errors | 604 |

Downlink port

| Port number | 0 |
| --- | --- |
| Status | 77 |
| Catastrophic errors | 820 |
| Link errors | 941 |
| Data errors | 1062 |
| Packets marked bad errors | 1183 |
| Global errors | 1304 |

Close 130
132
134

FIGURE 6B

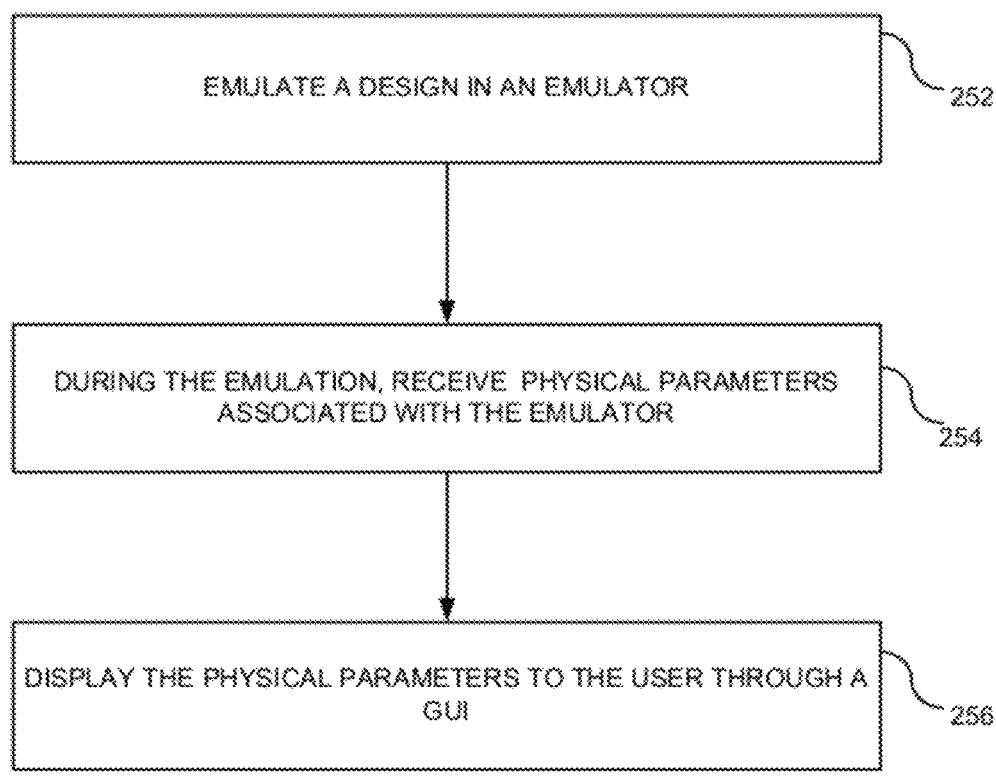

MONITORING PHYSICAL PARAMETERS IN AN EMULATION ENVIRONMENT

CROSS REFERENCE TO RELATED APPLICATIONS

This application is a Continuation of U.S. patent application Ser. No. 12/948,468, filed Nov. 17, 2010 now U.S. Pat. No. 8,195,446, which is a continuation of U.S. patent application Ser. No. 12/503,711, filed Jul. 15, 2009 (now U.S. Pat. No. 7,848,914, issued Dec. 7, 2010), which is a Continuation of U.S. patent application Ser. No. 11/517,227, filed Sep. 5, 2006 (now U.S. Pat. No. 7,567,894, issued Jul. 28, 2009), which application is a continuation of International Patent Application No. PCT/EP2006/060335, filed on Feb. 28, 2006, all of which are hereby incorporated by reference.

FIELD OF THE INVENTION

The present invention generally relates to hardware emulators, and more particularly to monitoring physical parameters in a hardware emulator.

BACKGROUND

Today's sophisticated SoC (System on Chip) designs are rapidly evolving and nearly doubling in size with each generation. Indeed, complex designs have nearly exceeded 50 million gates. This complexity, combined with the use of devices in industrial and mission-critical products, has made complete design verification an essential element in the semiconductor development cycle. Ultimately, this means that every chip designer, system integrator, and application software developer must focus on design verification.

Hardware emulation provides an effective way to increase verification productivity, speed up time-to-market, and deliver greater confidence in the final SoC product. Even though individual intellectual property blocks may be exhaustively verified, previously undetected problems appear when the blocks are integrated within the system. Comprehensive system-level verification, as provided by hardware emulation, tests overall system functionality, IP subsystem integrity, specification errors, block-to-block interfaces, boundary cases, and asynchronous clock domain crossings. Although design reuse, intellectual property, and high-performance tools all help by shortening SoC design time, they do not diminish the system verification bottleneck, which consumes 60-70% of the design cycle. As a result, designers can implement a number of system verification strategies in a complementary methodology including software simulation, simulation acceleration, hardware emulation, and rapid prototyping. But, for system-level verification, hardware emulation remains a favorable choice due to superior performance, visibility, flexibility, and accuracy.

A short history of hardware emulation is useful for understanding the emulation environment. Initially, software programs would read a circuit design file and simulate the electrical performance of the circuit very slowly. To speed up the process, special computers were designed to run simulators as fast as possible. IBM's Yorktown "simulator" was the earliest (1982) successful example of this—it used multiple processors running in parallel to run the simulation. Each processor was programmed to mimic a logical operation of the circuit for each cycle and may be reprogrammed in subsequent cycles to mimic a different logical operation. This hardware 'simulator' was faster than the current software simulators, but far slower than the end-product ICs. When Field Programmable Gate Arrays (FPGAs) became available in the mid-80's, circuit designers conceived of networking hundreds of FPGAs together in order to map their circuit design onto the FPGAs and the entire FPGA network would mimic, or emulate, the entire circuit. In the early 90's the term "emulation" was used to distinguish reprogrammable hardware that took the form of the design under test (DUT) versus a general purpose computer (or work station) running a software simulation program.

Soon, variations appeared. Custom FPGAs were designed for hardware emulation that included on-chip memory (for DUT memory as well as for debugging), special routing for outputting internal signals, and for efficient networking between logic elements. Another variation used custom IC chips with networked single bit processors (so-called processor based emulation) that processed in parallel and usually assumed a different logic function every cycle.

Physically, a hardware emulator resembles a large server. Racks of large printed circuit boards are connected by backplanes in ways that most facilitate a particular network configuration. A workstation connects to the hardware emulator for control, input, and output.

Before the emulator can emulate a DUT, the DUT design must be compiled. That is, the DUT's logic must be converted (synthesized) into code that can program the hardware emulator's logic elements (whether they be processors or FPGAs). Also, the DUT's interconnections must be synthesized into a suitable network that can be programmed into the hardware emulator. The compilation is highly emulator specific and can be time consuming.

There are many different physical parameters associated with an emulator environment, such as which board types are plugged into the emulator and where they are plugged in, what are the temperatures on the boards, what are the board failure rates, etc. Prior to compiling a design and trying to run it in an emulator, such physical parameters are helpful to have an understanding if the emulator can accept and emulate the design. Yet, there is not a known way to view such physical parameters in an effective manner. Particularly, there is not known a way to view such physical parameters in real time in a graphical user interface while the emulator is emulating a design.

Thus, it is desirable to provide an emulator environment with the ability to view physical parameters associated with the emulator.

SUMMARY

The present invention provides a method and system for monitoring and viewing physical parameters while the emulator is emulating a design. Additionally, the parameters are in real time or substantially real time, such as after a periodic update.

In one embodiment, a monitoring portion of the emulator periodically monitors the emulator boards and power supplies for physical information. The physical information is communicated to a workstation for communication to a user. For example, the workstation can display the physical information in a graphical user interface (GUI) that shows which boards are plugged in the system and which slots are empty.

In yet another aspect, the user can select a particular board in the system using the GUI and view communication information, such as data errors, status, link errors, global errors, etc.

In a further aspect, power supply information can be viewed, such as current and voltage levels, air temperature, fan speed, board temperatures at particular points, etc.

In another aspect, the IC layout on a board can be viewed with a graphical presentation of which ICs are malfunctioning. Even further, the sections within a particular IC can be viewed with a graphical presentation of sections within the IC that are malfunctioning.

These features and others of the described embodiments will be more readily apparent from the following detailed description, which proceeds with reference to the accompanying drawings.

BRIEF DESCRIPTION OF THE DRAWINGS

FIGS. 5A-5C show a GUI with different physical views of the actual system of FIG. 4.

FIGS. 6A and 6B show the GUI displaying error rates of various boards in the system.

FIG. 10 is a flowchart of a method for monitoring and displaying physical parameters in the system.

DETAILED DESCRIPTION

Figure 1:
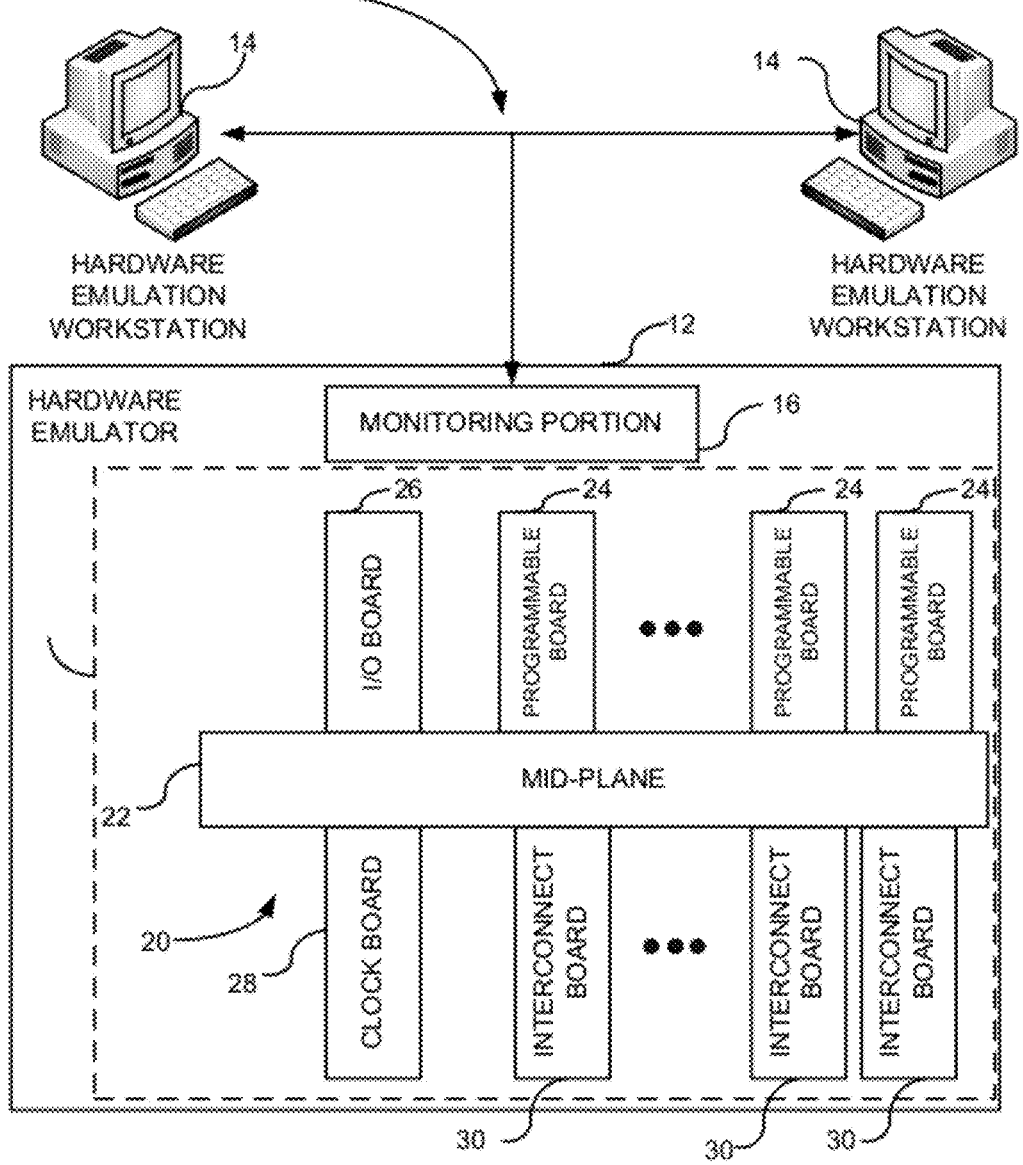
FIG. 1 is a system diagram of a hardware emulator environment according to the invention.

FIG. 1 shows an emulator environment 10 including a hardware emulator 12 coupled to one or more hardware emulator hosts 14. The emulator host 14 may be any desired type of computer hardware and generally includes a user interface through which a user can load, compile and download a design to the emulator 12. Additionally, the user can visualize physical parameters associated with the emulator through a graphical user interface (GUI) on any of the emulator hosts 14, as further described below.

The emulator 12 includes a monitoring portion 16 and an emulation portion 18. The emulation portion 18 includes multiple printed circuit boards 20 coupled to a midplane 22. The midplane 22 allows physical connection of the printed circuit boards into the emulator 12 on both sides of the midplane. A backplane may also be used in place of the midplane, the backplane allowing connection of printed circuit boards on one side of the backplane. Any desired type of printed circuit boards may be used. For example, programmable boards 24 generally include an array of FPGAs, VLSIs or ICs, or other programmable circuitry, that may be programmed with the user's design downloaded from the emulator host 14. One or more I/O boards interface 26 allow communication between the emulator 12 and hardware external to the emulator. For example, the user may have a preexisting processor board that is used in conjunction with the emulator and such a processor board connects to the emulator through I/O board interface 26. Clock board 28 generates any number of desired clock signals. And interconnect boards 30 allow integrated circuits on the programmable boards 24 to communicate together and with integrated circuits on the I/O board interface 26.

Figure 2:
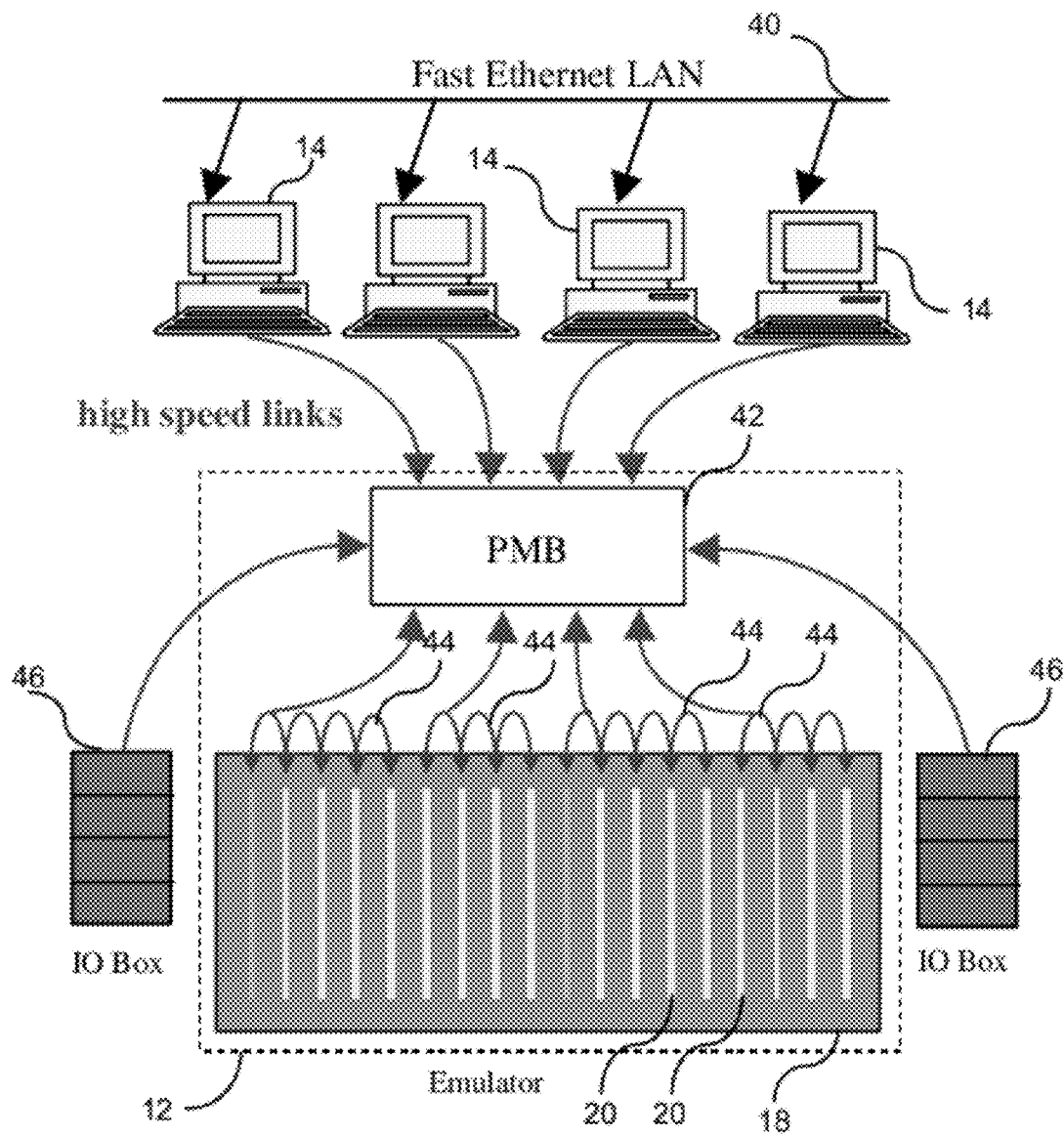
FIG. 2 is a more detailed system diagram showing multiple host computers coupled to the emulator through an intermediate platform maintenance board.

FIG. 2 shows a more detailed view of the system. The multiple host computers 14 are coupled together through a network 40, such as a LAN, but other networks can also be used. The host computers 14 are equipped with a high-speed-link PCI board coupled to a platform maintenance board (PMB) 42, which acts as the monitoring portion 16. The PMB 42 monitors various physical parameters in the emulator portion 18 as well as creates the interface between the emulator portion 18 and the host computers 14. The PMB 42 on a periodic basis (e.g., 10 seconds) transmits communication and monitoring reports to the host workstations 14 for display in the GUI. Similarly, the PMB 42 may receive information regarding the physical parameters of the emulator portion 18 periodically. For example, hardware (e.g., an FPGA) on each printed circuit board 20 has intelligence for monitoring physical parameters on its respective board and for sending this physical information to the PMB (e.g., every 5 seconds). Other changes, such as a detected error, are transmitted immediately upon and in response to the detection. Thus, the PMB 42 may instantaneously (as opposed to periodically) detect any changes in the emulation environment 10 and generate real-time state change messages to the host stations 14. All of the physical parameters obtained through the PMB may be obtained while the emulator portion 18 is performing emulation. Thus, several emulations may be separately running and the physical parameters of the emulator may separately be viewed on the GUI of the host computers. However, there need not be a link between the number of simultaneous emulations and the number of workstations. For example, many emulations can be simultaneously run through one workstation. The printed circuit boards 20 are grouped in a one-to-one correspondence with the number of host computers. This grouping allows one host computer to be associated with a group of boards 20 so that multiple high-speed links can be used in parallel. Obviously, the grouping used is a design choice and may easily be modified based on the design or not used at all. IO boxes 46 allow connection of other user boards to the system. The IO boxes 46 are also coupled to the PMB 42 and monitored thereby.

Figure 3:
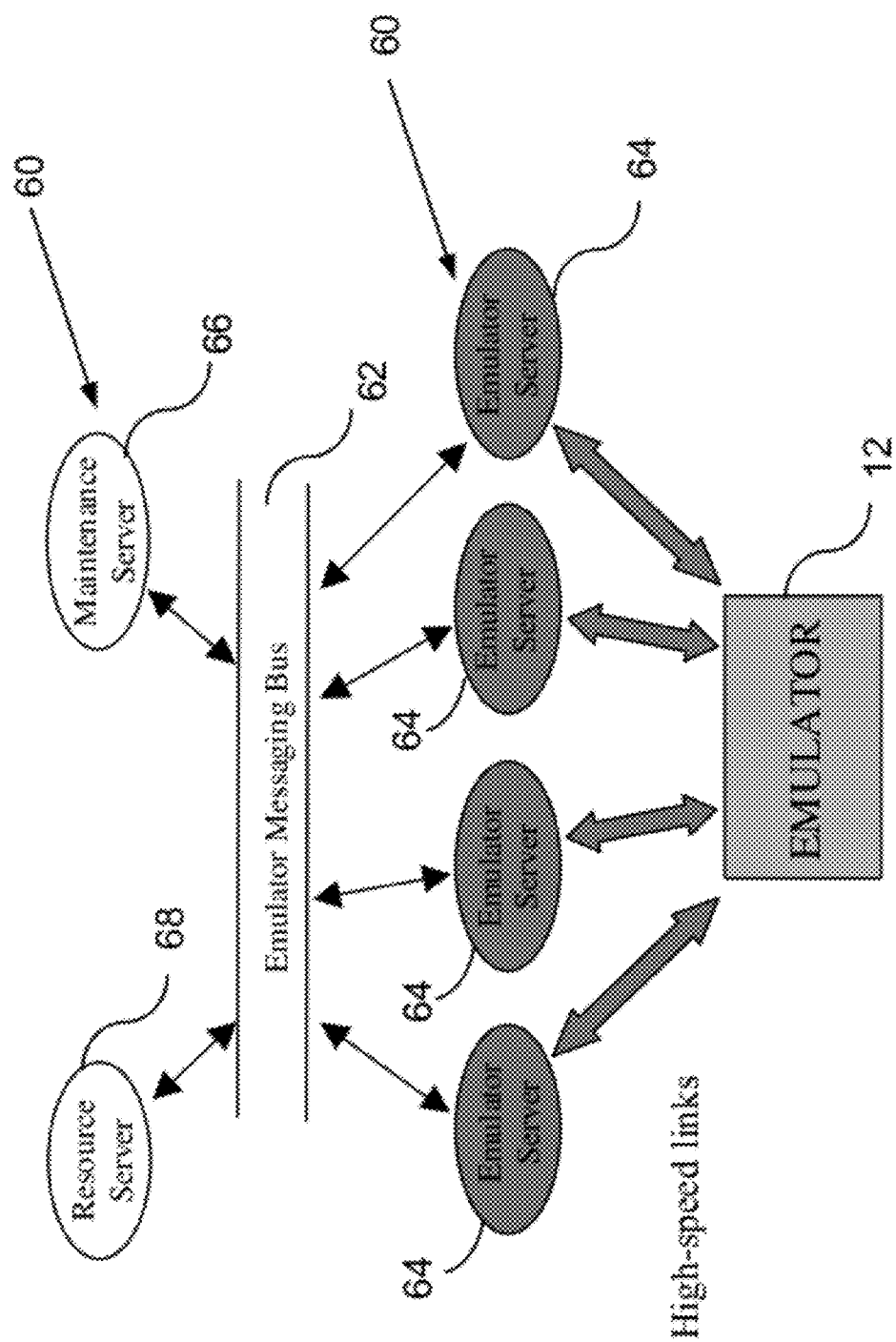
FIG. 3 is a high-level system diagram showing various servers connected through a messaging bus.

FIG. 3 shows a view of the emulator system including various servers 60 that communicate through a messaging bus 62. Emulator servers 64 are in charge of managing one physical host connection to the emulator and provide a way to transfer data between the emulator messaging bus 62 and the emulator 12. The maintenance server 66 is in charge of diagnostics, and storing maintenance information collected from other applications, servers, and/or emulator boards. The maintenance server also interacts with the GUI to display the information to the user. The resource server 68 is in charge of managing the different emulator resources provided to the applications.

Figure 4:
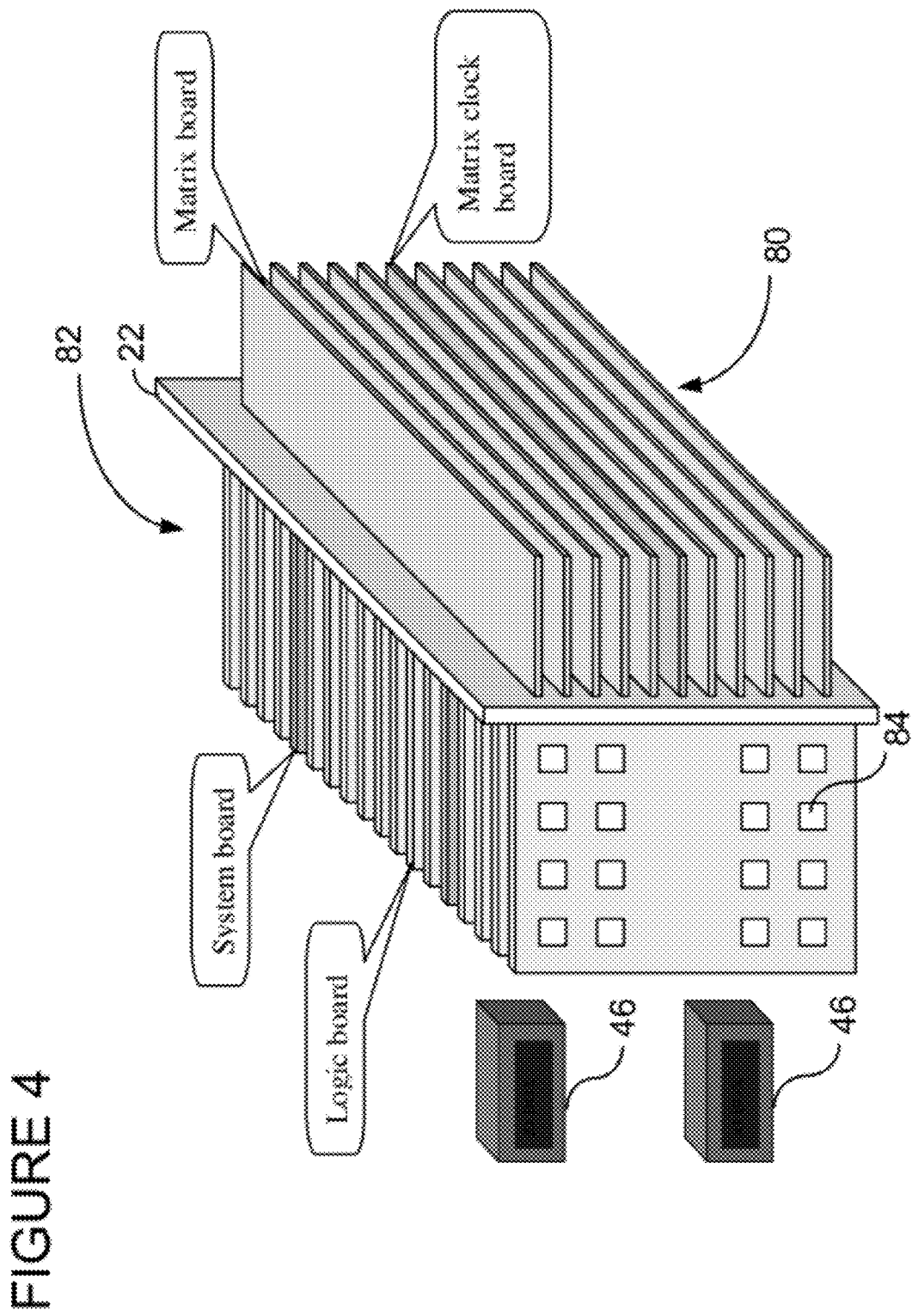
FIG. 4 is a three-dimensional physical view of a system of FIG. 1.

FIG. 4 shows a physical three-dimensional view of the emulator portion 18 including the midplane 22 having horizontal boards 80 coupled to one side of the midplane, and vertical boards 82 coupled to the opposite side of the midplane. The physical integrated circuits are shown at 84. The IO boxes 46 sit separately and are not generally considered part of the emulator.

FIG. 5A shows a window 100 of the GUI displayed on any of the computers 14 or accessible from the computers 14. The window 100 has an emulation information panel 102 and a physical system view panel 104. The emulation information panel 102 provides a summary of the number of boards in the system that are operational and provides the board types. For example, the panel 102 lists that nine AVB boards are operational and one CXB board is available. AVB is a board type that includes programmable FPGAs, VLSI, or ICs used for programming the user's design (see FIG. 1 at 24) whereas the CXB board is a board that generates the system clocks (see FIG. 1 at 28). Other boards are also listed, such as the SXB boards (switching matrices)(see FIG. 1 at 30), the SIOB boards (I/O board interface)(see FIG. 1 at 26) and the IO boxes 46. In panel 104, three tabs 106 provide different physical views of the system, including a top view, side view and IO view. The top view tab is selected in FIG. 5A and shows a physical view of the boards of FIG. 4. Only the top-most board of the horizontal boards 80 can be seen, while all of the vertical boards 82 are shown. The midplane 22 is shown having numbers 0-15 representing each available AVB slot for the vertical boards 82, plus 0-1 representing SIOB slots for the vertical boards 82. The darkened slots represents the boards physically positioned in the slots, while the white boxes, shown at 108, represent empty slots. The physically present boards may also be shown in different colors (not shown) to represent whether the board is correctly operating or has a malfunction.

Figure 5B:
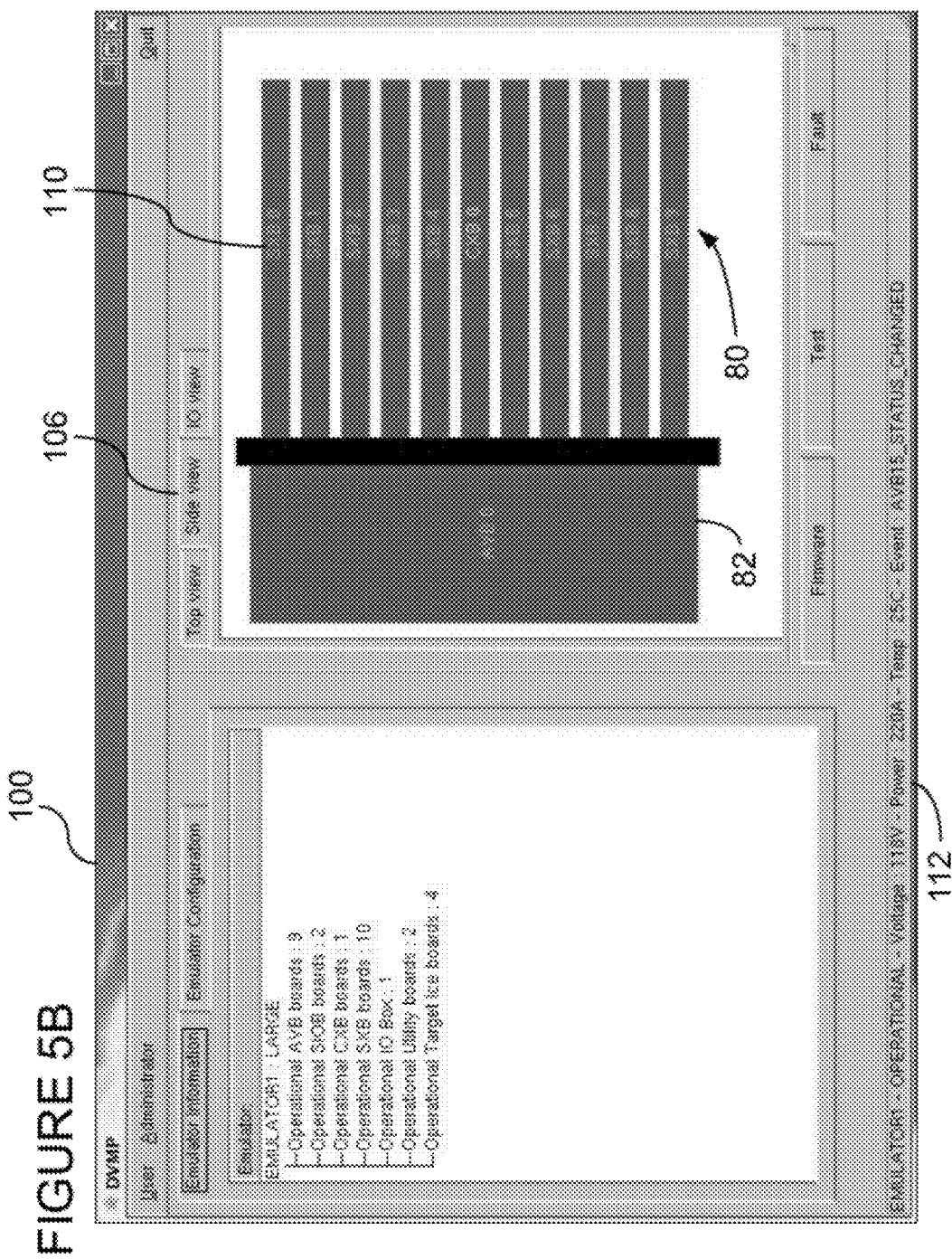

FIG. 5B shows the same window 100 with the side view tab 106 selected. In this view, the physical boards of the system shown in FIG. 4 are seen from the side view. In this case, only one vertical board 82 in slot 0 is visible, while the horizontal boards 80 are displayed including indicia 110 to indicate the board type.

Thus, from FIGS. 5A and 5B, the physical view of the system is shown including board types, their slot positions within the system, and whether or not they are properly functioning. Additionally, both views provide a status line 112 that provides real time physical parameters associated with the system, such as the emulator name (shown as an alpha-numeric string), whether that emulator is operational, the voltage, power, temperature, and the last change in the physical environment that occurred.

FIG. 5C shows the same window 100 with the IO view tab 106 selected. This view shows two IO boxes 114 and 116. IO box 114 is currently shown as operational with six boards plugged in, while IO box 116 is shown having empty slots.

Figure 6B:
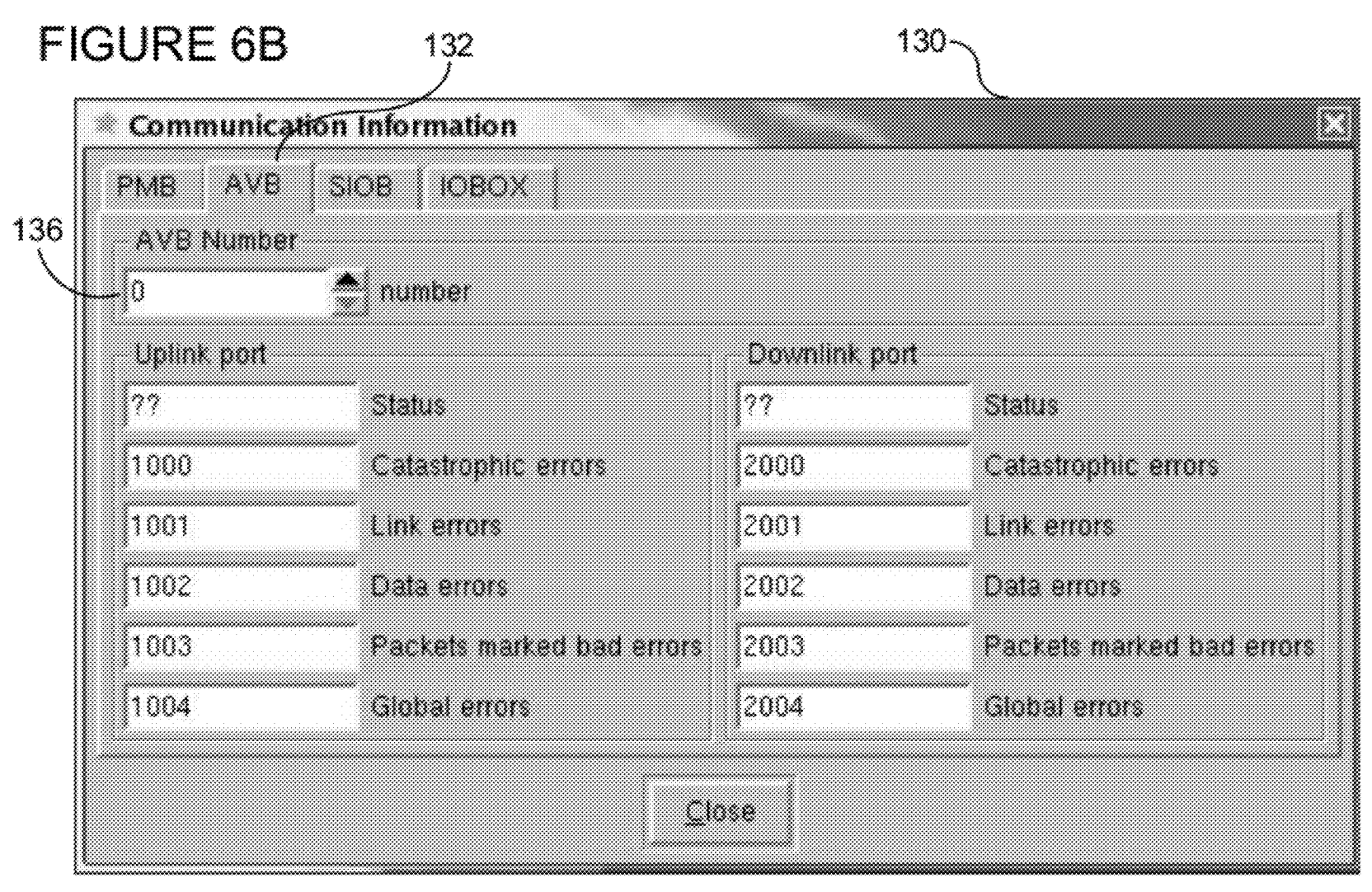

FIGS. 6A and 6B show different views related to communication information in a window view 130. Tabs 132 allow the user to select the board type within the system. For example, in FIG. 6A, the tab PMB is selected and panel 134 shows different communication errors associated with the PMB 42. For example, catastrophic errors, link errors, data errors, packets marked bad errors and global errors. Thus, the physical error information is available for any board.

FIG. 6B shows the window view 130 with the AVB tab 132 selected. In this view, a drop down window 136 is provided to allow the user to select which AVB board to view. Thus, for any desired AVB, the user can view real time or substantially real time error information. Tabs 132 also include views of other system boards, such as SIOB and the IO Boxes.

Figure 7A:
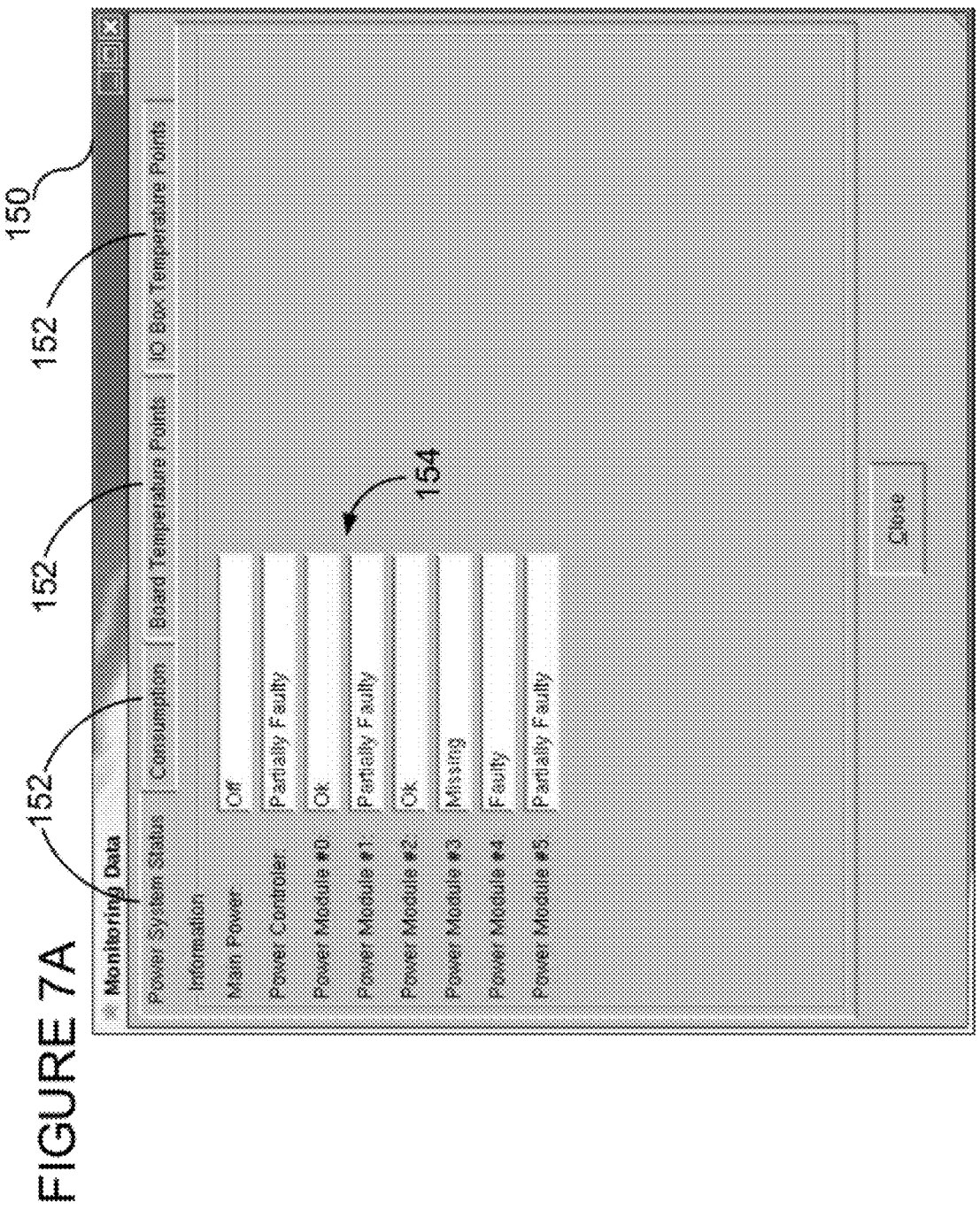
FIGS. 7A-7D show power and temperature information associated with the system using a GUI.

FIGS. 7A through 7D show a window 150 related to monitored data within the system. Thus, other physical parameters associated with the system may be viewed in the GUI in real time. In FIG. 7A, window 150 has tabs 152 including a power status system tab, a consumption tab, a board temperature tab and an IO Box temperature tab. FIG. 7A shows the power status system tab selected and shows information windows 154 that indicate whether the main power is on or off, and the status of various power modules. Different status information shows that module is OK, missing, faulty, partially faulty, etc.

Figure 7B:
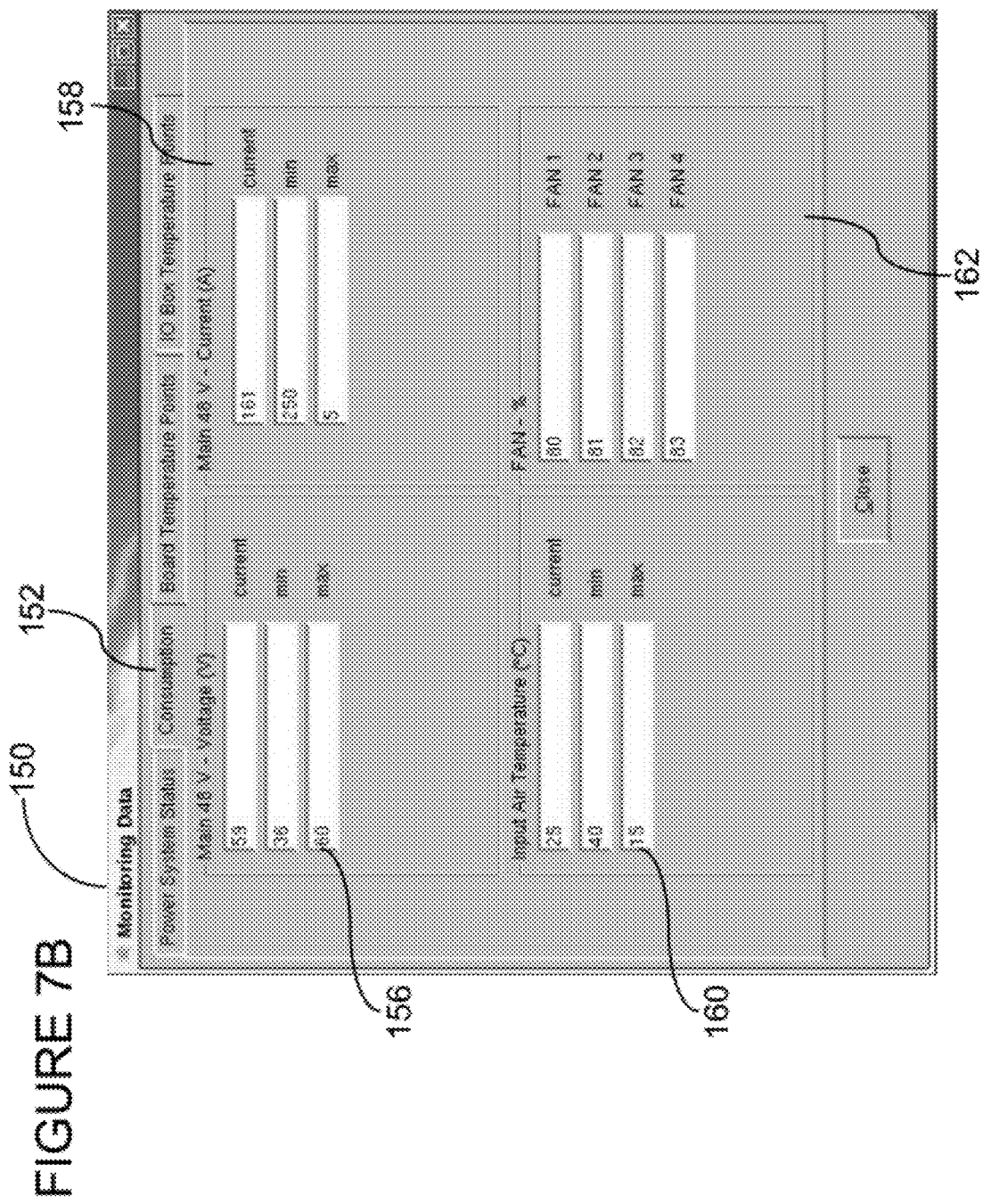

FIG. 7B shows the consumption tab 152 selected resulting in four panels 156, 158, 160, and 162 being displayed. Panel 156 shows the current voltage consumption and the minimum and maximum voltage consumption. Panel 158 shows the current being consumed and the minimum and maximum current levels used. Panel 160 shows the current air temperature within the emulator as well as the minimum and maximum air temperatures. Panel 162 shows the fans being used in the system and their current percentage of operational capacity. Thus, 80% means the fan can increase another 20% to be at maximum capacity, but increasing fan speed can increase noise and vibration within the system.

Figure 7C:
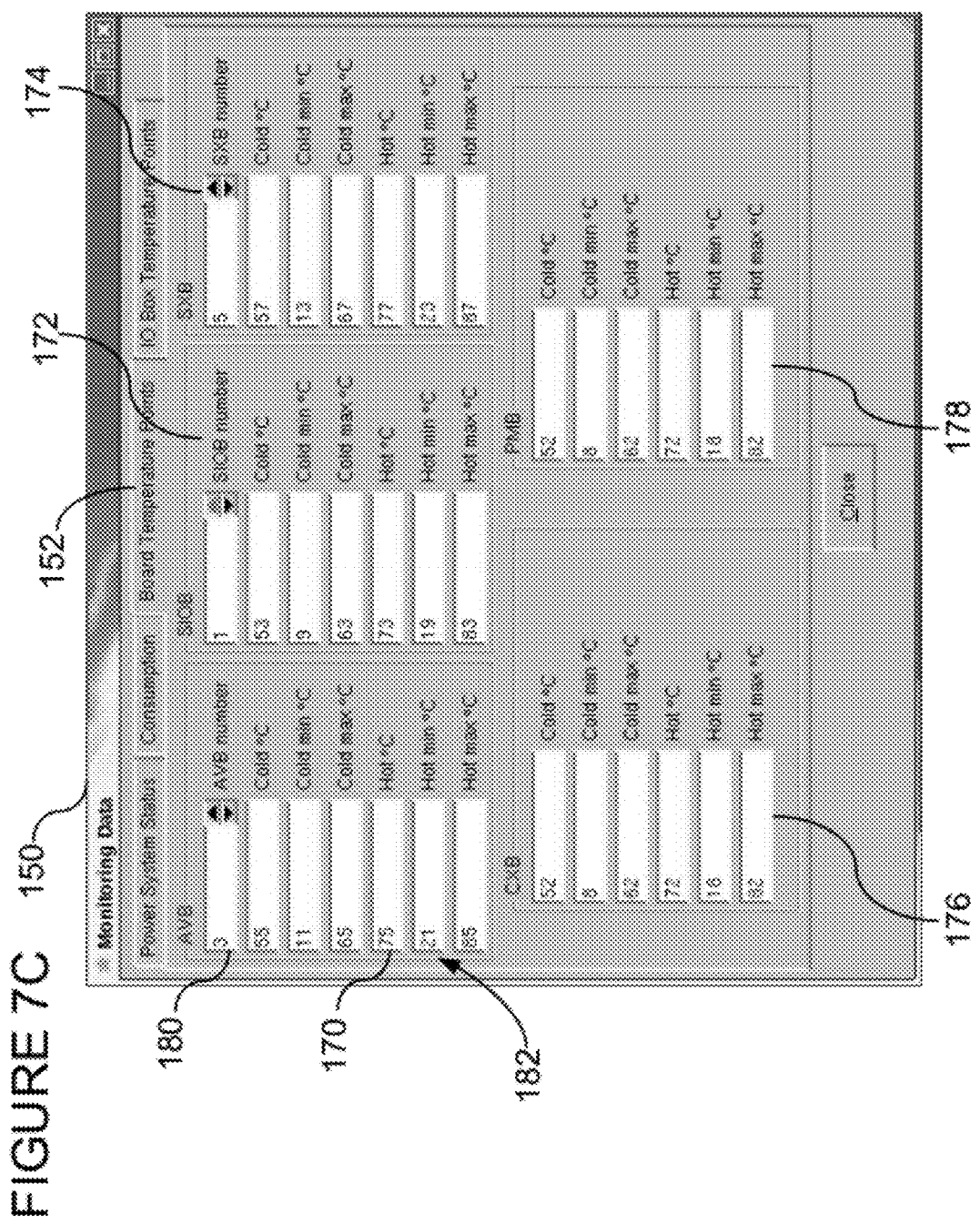

FIG. 7C shows window 150 with the board temperature tab 152 selected. In this window view, five panels are displayed 170, 172, 174, 176 and 178, each representing a different board type in the system. In panel 170, a drop down window 180 allows the user to select the particular AVB in the system. Currently, AVB number 3 is shown. Information windows 182 show the various temperatures of preselected points on the board. In this example, each AVB has a preselected hot point and a preselected cold point in which a temperature sensor is positioned. The information windows 182 show the current temperature at each of the hot and cold points as well as the minimum and maximum temperatures at each point. Each of the other panels, 172, 174, 176 and 178 have similar functionality for the SIOB, SXB, CXB, and PMB, respectively.

Figure 7D:
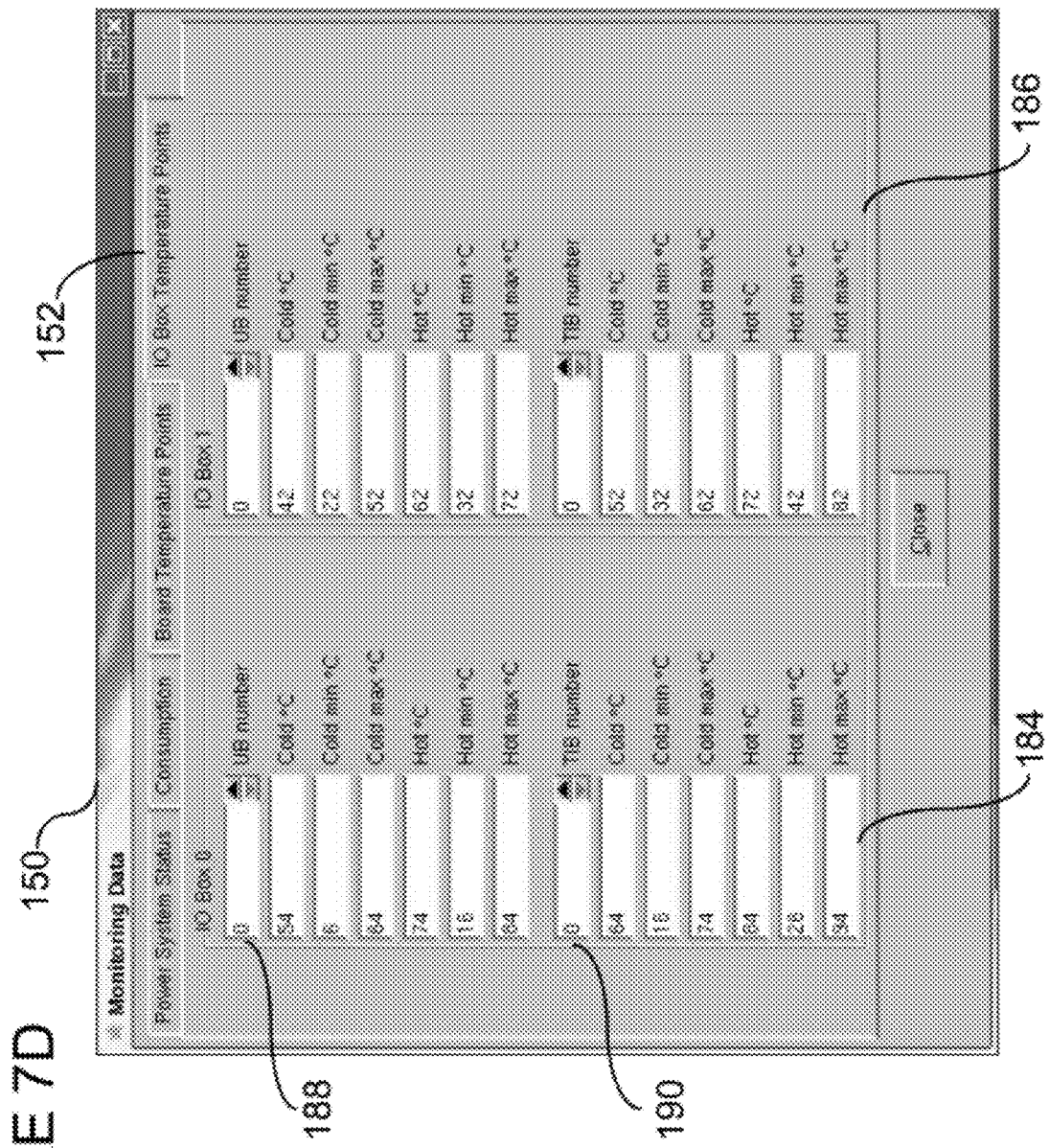

FIG. 7D shows window 150 with the IO Box temperature points tab 152 selected. In this case, two panes 184 and 186 are shown, each for its respective IO Box. In pane 184, drop down window 188 allows selection of different UB-type boards in the IO Box, while drop down window 190 allows different TIB-type boards to be selected. Once the desired boards are selected the current hot and cold point temperatures as well as the minimum and maximum temperatures are provided. Similar operation can be performed in pane 186.

Figure 8A:
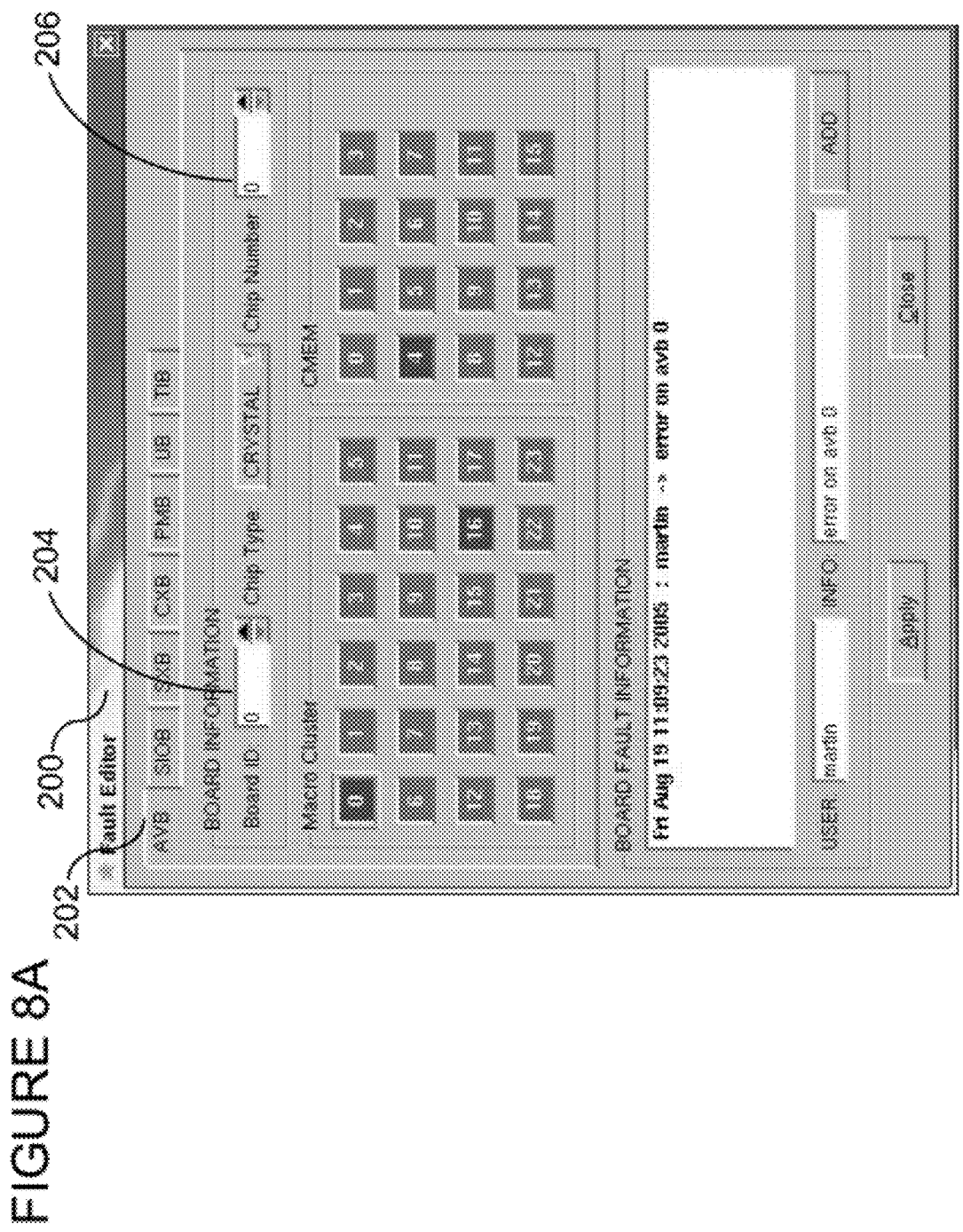
FIGS. 8A and 8B show a logical representation of an internal portion of an IC and a physical view of a printed circuit board using the GUI.

FIG. 8A shows further physical information associated with the boards within the emulator environment 10. In particular, FIG. 8A shows a fault editor window 200 that allows the user to visualize a cluster or memory within an IC to determine which areas of the IC have faults. Tabs 202 allow the user to select the board type, and drop-down window 204 allows the user to select the particular board within the system. Drop-down window 206 allows the user to select the particular IC on the board to view whether the clusters and memory areas of the IC are functioning properly. Areas that are not functioning properly are indicated with a different color (not shown), such as red to indicate a problem area and green to indicate proper functionality.

Figure 8B:
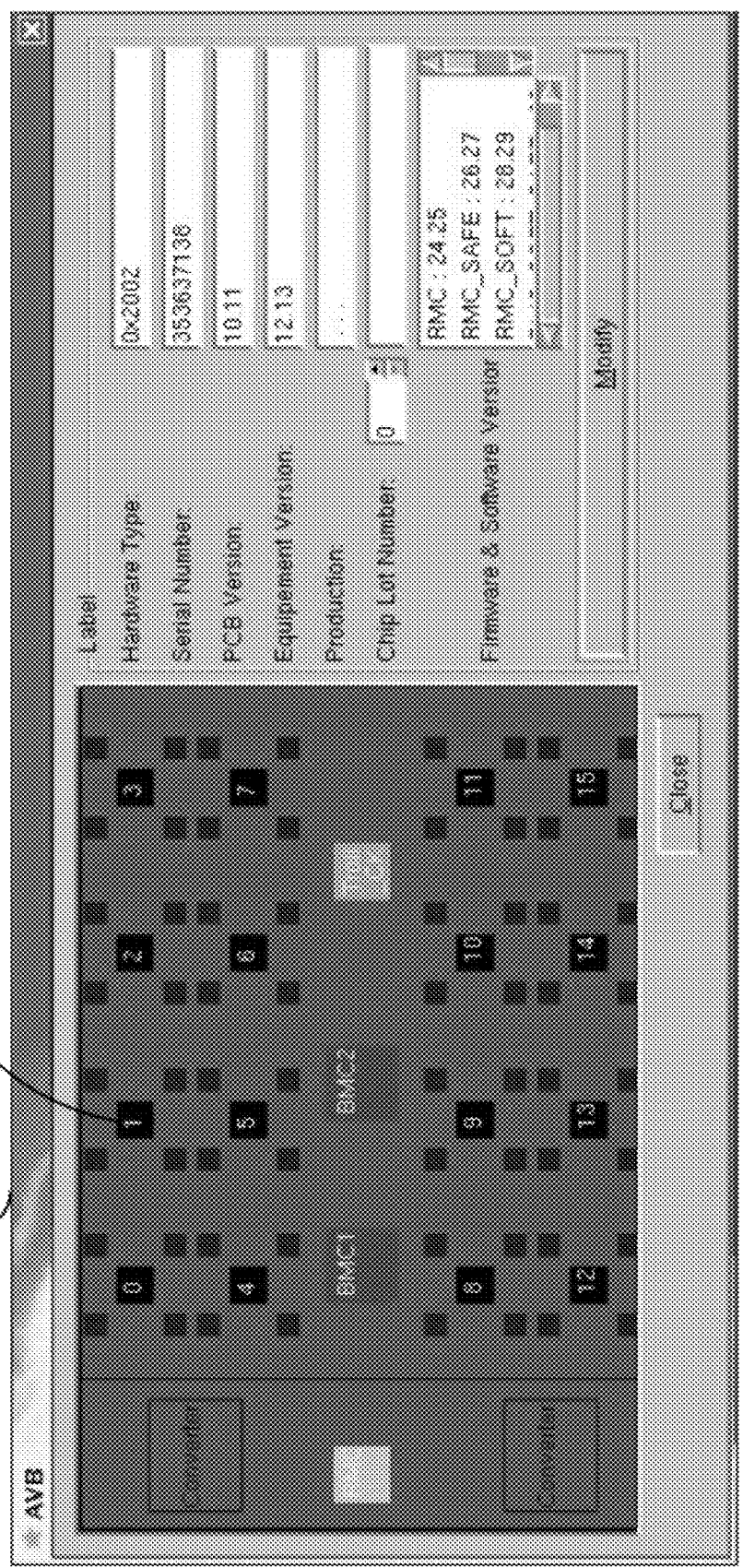

FIG. 8B shows a window 220 with a physical view of a board in the system. The board view shows various ICs such as at 222. ICs that are not functioning properly are shown in a different color (not shown). In this way, a user can view physical parameters, such as the functionality of an IC, using the GUI and take corrective action if necessary.

Figure 9A:
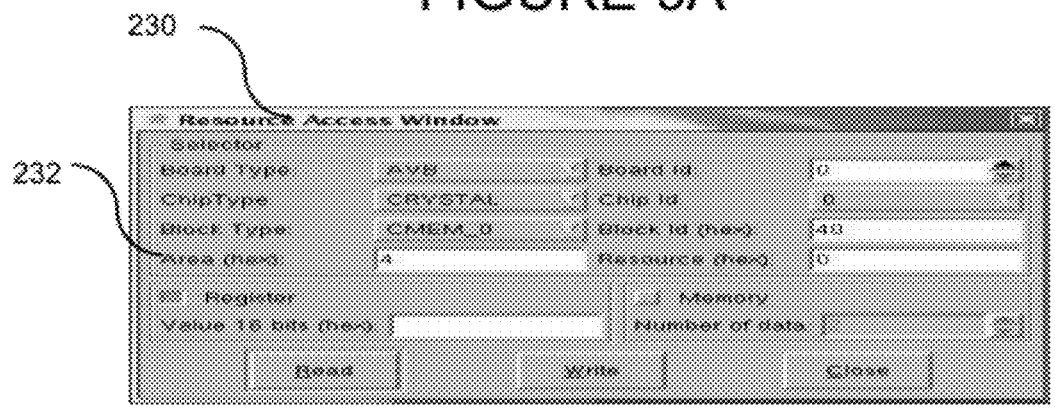
FIGS. 9A and 9B show particular registers of the system accessed through the GUI.
Figure 9B:
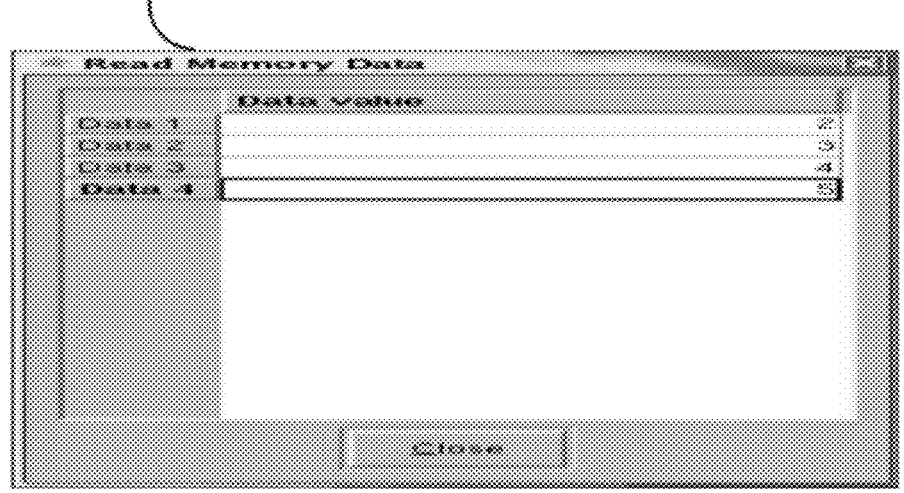

FIG. 9A includes a resource access window 230 that allows a user to access a particular register on a board in the system and modify the contents of that register using the GUI. For example, window 232 shows a particular register for the chosen board, chip, and block type. FIG. 9B shows a similar window 234 allowing the user to read and modify memory.

FIG. 10 shows a flowchart 250 of a method for displaying physical parameters within a GUI. In process block 252, a design is currently being emulated in the emulator. In process block 254, during the emulation, the monitoring portion of the emulator receives physical parameters associated with the emulation portion of the emulator, such as all of the parameters discussed in the previous Figures. In process block 256, the physical parameters are displayed in the GUI. Several host computers may be performing emulation within the same emulator environment and simultaneously be able to view the physical parameters associated with the emulator through interconnection with the PMB.

Having illustrated and described the principles of the illustrated embodiments, it will be apparent to those skilled in the art that the embodiments can be modified in arrangement and detail without departing from such principles.

It should be recognized that the GUI application can run out of any workstation not just the host workstation.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

We claim:

1. A method of monitoring an emulation environment used to emulate an Integrated Circuit design, comprising:
    emulating the Integrated Circuit design in an emulator, the emulator including multiple printed circuit boards housed in an emulator chassis, wherein emulating the Integrated Circuit includes mimicking the Integrated Circuit design using programmable logic;
    receiving temperature information associated with one or more of the printed circuit boards, wherein each printed circuit board has two or more temperature sensors, a temperature sensor being positioned at a hotter point and a temperature sensor being positioned at a colder point of each printed circuit board;
    receiving a selection of a first printed circuit board of the one or more printed circuit boards;
    displaying a user interface including the received temperature information for the first printed circuit board, wherein the user interface is a graphical user interface wherein the received temperature information comprises a current temperature at the hotter point and colder point of each printed circuit board, wherein the two or more temperature sensors of each printed circuit board are located at predetermined positions and wherein displaying the temperature information includes displaying temperature information at the predetermined positions, wherein the temperature information includes a maximum and minimum temperature at each predetermined position; and
    receiving a selection of a second printed circuit board of the one or more printed circuit boards and displaying the user interface including the received temperature information for the second printed circuit board, while no longer displaying the temperature information for the first printed circuit board.

2. The method of claim 1, wherein the temperature information includes current temperatures at the predetermined positions.

3. The method of claim 1, further including displaying in the user interface an amount of current being consumed by the emulator.

4. The method of claim 3, wherein the amount of current includes minimum and maximum current levels.

5. The method of claim 1, wherein the user interface includes multiple panels, each panel indicating a board type used in the emulator.

6. The method of claim 1, further including providing an indication in the user interface which printed circuit boards are functioning properly and which printed circuit boards are not functioning properly.

7. The method of claim 6, further including selecting a printed circuit board within the emulator, requesting error information associated with the selected printed circuit board and displaying the error information in the graphical user interface.

8. The method of claim 1, further including, in response to selection of a printed circuit board within the emulator, displaying a view of the selected printed circuit board including functionality and position of Integrated Circuits thereon.

9. A non-transitory computer-readable storage having instructions stored thereon for executing a method, the method comprising:
    emulating a design in an emulator, the emulator including multiple printed circuit boards that store the design in programmable logic so as to emulate the design;
    receiving temperature information associated with one or more of the printed circuit boards, wherein each printed circuit board has two or more temperature sensors, a temperature sensor being positioned at a hotter point and a temperature sensor being positioned at a colder point of each printed circuit board;
    receiving a selection of one of the multiple printed circuit boards; and
    displaying a user interface including the received temperature information for only the selected printed circuit board, wherein the user interface is a graphical user interface and further including displaying in the graphical user interface information related to an operational capacity of one or more fans being used in the emulator and current information, wherein the current information includes minimum and maximum current levels used, and wherein the received temperature information comprises a current temperature at the hotter point and colder point of at least one of the printed circuit boards.

10. The non-transitory computer-readable storage of claim 9, wherein the two or more temperature sensors of each printed circuit board are located at predetermined positions and wherein displaying the temperature information includes displaying temperature information at the predetermined positions.

11. The non-transitory computer-readable storage of claim 10, wherein the temperature information includes a maximum and minimum temperature at the predetermined positions.

12. The non-transitory computer-readable storage of claim 10, wherein the temperature information includes current temperatures at the predetermined positions.

13. The non-transitory computer-readable non-volatile storage of claim 9, further including displaying in the user interface information related to one or more fans being used in the emulator chassis.

14. The non-transitory computer-readable storage of claim 13, further including displaying in the user interface information related to a percentage of operational capacity of the one or more fans.

15. The non-transitory computer-readable storage of claim 9, further including displaying in the user interface an amount of current being consumed by the emulator.

16. The non-transitory computer-readable storage of claim 15, wherein the amount of current includes minimum and maximum current levels.

17. The non-transitory computer-readable storage of claim 9, wherein the user interface includes multiple tabs, each tab indicating a board type used in the emulator.

18. The non-transitory computer-readable storage of claim 9, further including providing an indication in the user interface which printed circuit boards are functioning properly and which printed circuit boards are not functioning properly.

19. The non-transitory computer-readable storage of claim 18, further including selecting a printed circuit board within the emulator, requesting error information associated with the selected printed circuit board and displaying the error information in the user interface.

20. The non-transitory computer-readable storage of claim 9, further including, in response to selection of a printed circuit board within the emulator, displaying a view of the printed circuit board including functionality and position of Integrated Circuits thereon.

* * * * *